(12) United States Patent
Lungi (10) Patent No.: US 10,264,100 B2
(45) Date of Patent: Apr. 16, 2019

(54) IMPORT / EXPORT CUSTOM SOFTWARE APPLICATION (IECUSOFT)

(71) Applicant: Jeremy Lungi, Fort Wayne, IN (US)

(72) Inventor: Jeremy Lungi, Fort Wayne, IN (US)

( * ) Notice: Subject to any disclaimer, the term of this patent is extended or adjusted under 35 U.S.C. 154(b) by 217 days.

(21) Appl. No.: 15/166,688

(22) Filed: May 27, 2016

(65) Prior Publication Data

US 2017/0346925 A1    Nov. 30, 2017

(51) Int. Cl.

| G06F 15/16 | (2006.01) |
|---|---|
| H04L 29/08 | (2006.01) |
| G06F 8/61 | (2018.01) |
| G06F 8/65 | (2018.01) |
| G06Q 10/08 | (2012.01) |
| G06Q 30/00 | (2012.01) |
| G06Q 50/18 | (2012.01) |

(52) U.S. Cl.
CPC .............. *H04L 67/34* (2013.01); *G06F 8/61* (2013.01); *G06F 8/65* (2013.01); *G06Q 10/08* (2013.01); *G06Q 10/0832* (2013.01); *G06Q 30/018* (2013.01); *G06Q 50/18* (2013.01)

(58) Field of Classification Search
CPC .............. G06F 8/61; G06F 8/65; H04L 67/34
See application file for complete search history.

(56) References Cited

U.S. PATENT DOCUMENTS

| 2005/0099292 A1* | 5/2005 | Sajkowsky | G06K 17/00 340/539.13 |
|---|---|---|---|
| 2006/0075001 A1* | 4/2006 | Canning | G06F 8/65 |
| 2010/0063888 A1* | 3/2010 | Sajkowsky | G06Q 20/204 705/17 |
| 2015/0222637 A1* | 8/2015 | Hung | G06F 21/53 726/1 |
| 2016/0057619 A1* | 2/2016 | Lopez | G06F 9/455 380/247 |
| 2016/0328692 A1* | 11/2016 | Camps | G06Q 20/204 |
| 2017/0104749 A1* | 4/2017 | Koster | H04L 63/0823 |

* cited by examiner

*Primary Examiner* — Mohamed A Wasel
(74) *Attorney, Agent, or Firm* — Jeremy Lungi (57) ABSTRACT

A method of transmitting data information electronically primarily between two units that interface with third intermediate unit. Primary unit 150 "VARe" processes received raw data information for validation; and primary unit 180 "USeR" transmits raw data information to be processed then receive back the processed data information, and other pertinent information; the intermediate unit 135 "PUMa" interfaces among VARe and various USeR devices to ensure proper and correct flow of data information. PUMa installs the software application online in the USeR unit and frequently checks VARe for any code changed, added, deleted, replaced, mutated and or permutated; then updates the USeR with accurate and valid data, algorithm and logical computation code for proper transaction and appropriate transmission of data information. The data information submitted by the USeR is checked and validated against the source code stored in VARe in real-time for an acceptance and approval or a rejection and disapproval.

16 Claims, 9 Drawing Sheets

PUMa, VARe, and USeR Interface Diagram

FIG 1: PUMa, VARe, and USeR Interface Diagram

IMPORT / EXPORT CUSTOM SOFTWARE APPLICATION (IECUSOFT)

BACKGROUND OF THE INVENTION

1. Field of the Invention

The current invention pertains to a software program development tool: First to transmit raw data information, second to process raw data information for validation and third to install and update the necessary codes needed to transmit and validate the raw data information in a typical transaction. Particularly, the present invention relates to an object-oriented programming system that provides interface between two databases or servers containing data information needed to complete a particular transaction. More particularly, this invention relates a system that provides an interface between databases that provide source code, raw data information, and update data code.

The present invention is classified as a stand-alone development tool that run its own local database to create and to generate raw data information and as an integrated case tool that interface first with a network database to validate raw data information; and second with an update database to update the software program. Both stand-alone development tool and integrated case tool use an Integrated Development Environment (IDE) tool to generate (a top-down) graphical display representation of the program code such as Graphical User Interface (GUI).

2. The Prior Art

With so many imported/exported items and so many US government departments and agencies in need of this data information for proper and legal trade of goods, the customs process was, and still is cumbersome, complex, redundant, fraught with eccentricities and time consuming. Only those adept and familiar enough with the process have access and are able to navigate its procedural morass. While the customs primary mission is to prevent terrorism from entering the US, it also is responsible for collecting import duties, and enforcing U.S. regulations, including trade.

In today's import/export customs software industry, there are many kinds of electronic filing (e-filing) that fulfills the customs transaction requirements with some encumbrances including limitations, conditions and setbacks that lead to time consuming and processing delay. These encumbrances' occurrences are mostly due to constant rates change such as antidumping and countervailing rates to balance the economy and the budget which makes it difficult to keep up with these changes.

Furthermore, with 9/11 attacks, security concerns adding other factors to the mix. By 2003, the US Customs and Border Protection (CBP) antiquated Automated Commercial System (ACS) became dangerously overwhelmed. Homeland Security created a new CBP system ICE (Immigration and Customs Enforcement). The ACE (Automated Commercial Environment) part of ICE was to provide a platform to share trade information but it fails to precede the arrival of goods which results in being delayed or turned away the shipment of goods until May 1, 2015 where ACE becomes operational and available to a certain group of users that include: Carriers, Brokers, Freight Forwarders, Services Centers, and Exporters. The CBP system deployment core trade processing capabilities in ACE is projected to be completed by December 2016; users should acquire any kind of e-filing software to fulfill the transaction need.

Thus, there is a dire need in the import/export customs software industry for an e-filing system that would interface CBP users' transactions to CBP network database for data validation purpose. IECUSOFT e-filing system is best fitted to accommodate and to fulfill the need of CBP users by implementing an efficient, affordable and user friendly software application system.

BRIEF SUMMARY OF THE INVENTION

This patent conveys, discloses and claims an advantageous tool, a beneficial system, and an important invention for an automated electronic-filing in the import/export customs field. The Software design intention and focus is to fill in the market void by providing the tools needed to CBP users and ABI (Automated Broker Interface) participants. The Software is NOT intended to be in competition with the existing software in the market but rather to provide a more affordable, user friendly software and fast processing CBP Software that will communicate with the customs for validation of duties, taxes, and fees; data information approval; cargo release of goods; and electronic payment through ACH (Automated Clearing House). And more specifically to implement a modern upgrade software design which is comparable and analogous to the new age technology.

The software system's main window displays a deactivated chapters selection button and different activated and deactivated record and executable buttons. The chapters' selection button becomes activated after the user identity is known. Any chapter selected displays different deactivated records for a specific transaction. These records become activated after the user identifies the details data to be transmitted. Mandatory records are required records; conditional and or optional records are required only upon a fulfill condition(s) in the mandatory record. One and only one record can be activated at one time in hierarchy order needed for a particular transaction. This is part of the self-guided software in order to prevent transmission error, at the same time to save processing time and to increase accuracy.

The first advantage of this invention is that the software system eliminates the cumbersome, complex, and redundant customs' data entry confusion. The second advantage of this invention is that the software system eliminates customs' processes fraught with eccentricities. The third advantage of this invention is that the software system reduces customs time consuming and errors as the transaction process goes on according to the data information entered. The fourth advantage is that all data entered in each individual field can be deleted all at once rather than deleting individually. The fifth advantage is that all data entered in each individual field are internally validated before transmitting the data. The sixth advantage is that the user does not necessary need to know beforehand the valid codes needed to enter into the data field; the software system is built-in with all necessary CBP codes for any transaction. Also the software system is equipped with a date picker feature to format the date to CBP format. The seventh advantage is that the software system computes the check digit for the user according to CBP check digit computation formula rules. The eighth advantages are the tariff, tax, fee, antidumping, and countervailing duties computations are performed automatically for the user according to CBP's duty calculation sets of formula rules. The ninth advantage is the system populates these data in the field for the user: Rates, class code, duty code, and case numbers. The tenth advantage is the data entered in the mandatory record sets the transaction pace by activating the required conditional and optional records and enabling the individual required fields inside the conditional and optional records. The eleventh advantage is that the software systems generates and creates new records for the user to speed up the customs process. The twelfth advantage is that the totals are automatically computed and populated with the correct values on the data fields for the user. The thirteenth advantage is that once the records are done filled out, the Block Control Trailer and the Batch Control Trailer are generated and populated to complete the transaction. The fourteenth advantage is the software system writes the data information on the CBP Forms and save the information for later use. The fifteenth advantage is that the software system rearranges the data in length, class, and position; and also checks for proper characters data field entry before transmitting. The only data the user needs to obtain is the US Harmonized Tariff Scheduled (HTSUS, "tariff number") for the commodity being transacted the. This tariff number is first checked for a valid tariff number by the software system.

The above advantages of this invention are provided by the software system in accordance with this invention. The software system of this invention includes a user client unit called "USeR" short for Utilize, Send, and Receive. USeR utilizes the software to send and receive data information. The above USeR unit is interface first to a server unit called "VARe" short for Validate, Approve, and Release. VARe validates data information, approves the transaction, and releases the goods; and then secondly the USeR unit is interface to another server unit called "PUMa" short for Provide, Update, and Maintain. PUMa provides the software system, updates the software data, maintains and services the software environment. PUMa maintains a programming database mainly the tariff numbers database; category number database; rate database; units codes database; duty, tax, and fee codes database; items description database, class codes database; transaction code database; flags database; city codes; district/port codes; foreign port codes; state codes including Canada and Mexico; country codes (both origin and export); government agencies and firms code database; entry type code database; compliance code database; container code database; missing code database; automated clearing house database; and many other pertinent code and data for import and export usage described in the CBP.

In accordance with this invention the interface provides the USeR with an acceptance or rejection details message of the processed data information to determine whether the transaction is approved or disapproved. The interface allows the users to transmit data information and question for various different data scenarios and statuses; the transmitted data may then be saved, printed, or electronically delivered. Also the interface allows the user to register for various services and enroll in different CBP programs such the electronic payment mechanism, the ACH (Automated Clearing House).

In accordance with this invention the interface allows PUMa to examine the software system operation and performance; acquire data code changed, deleted, added and mutated or permutated. The interface allows PUMa to maintain the software system up to date, control the software system application and utilization, repair broken data code, and install the software system in various computers and electronic devices.

In accordance with this invention the interface allows VARe to validate and approve a transaction; to provide acceptance or rejection details message of a transaction and to provide data code changed, deleted, added and mutated or permutated. VARe registers and enrolls users for various programs offered by CBP.

In accordance with this invention the software system eliminates the use of customs paper filing and backup log of goods in customs warehouse; implements a user friendly automated electronic filing system for fast and easy validation of commodities and release of goods; provides an electronic payment through the Automated Clearinghouse (ACH). Overall, the software system accommodates customs paper filing of the old age world to customs paperless filing of the new age technology.

BRIEF DESCRIPTION OF THE SEVERAL VIEWS OF THE DRAWING

The above features of this invention are described in the following detailed description and shown in the following drawings.

DETAILED DESCRIPTION OF THE INVENTION

The following detailed description of the invention is NOT intended to be in competition with the existing software in the market but rather to provide a more affordable, user friendly, and fast processing CBP Software that will interface and communicate with the customs in a simple and efficient operating method for validation and release of goods; more specifically to implement a modern upgrade software design which is comparable and analogous to the new age technology.

The Software design intention and focus is to fill in the market void by providing the tools needed to adept and familiar customs users, as well as to inept or unskilled and unfamiliar customs amateur to navigate the CBP's procedural morass. And also to accommodate customs paper filing of the old age world to customs paperless filing of the new age technology.

Figures 1, 1A, 1B:
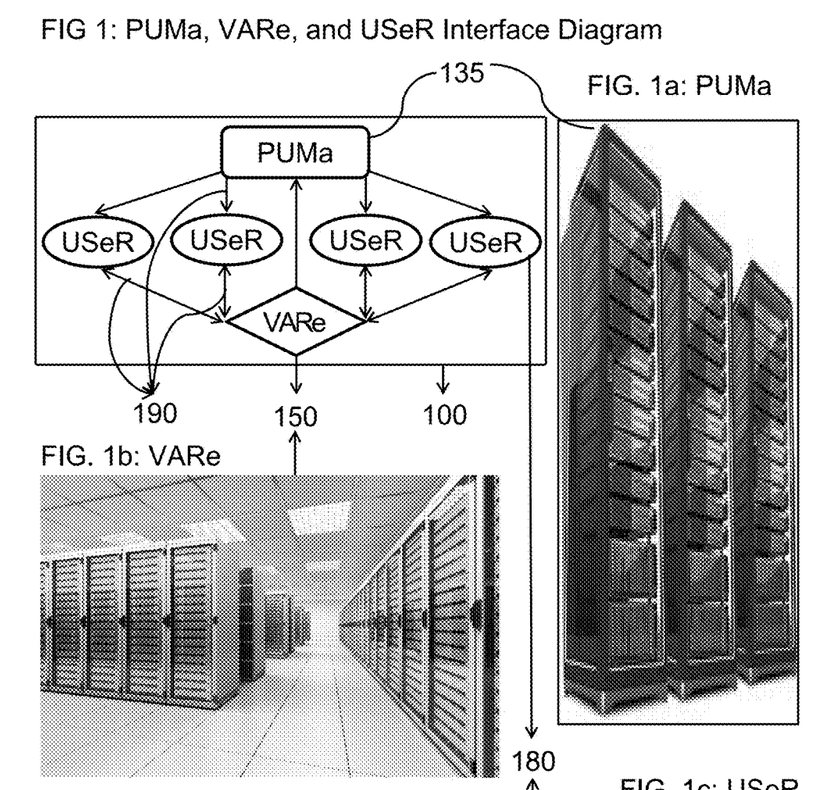
FIG. 1: Illustrates the PUMa, VARe, and USeR Interface Diagram.
FIG. 1a: Illustrates the PUMa Unit.
FIG. 1b: Illustrates the VARe Unit.

FIG. 1 illustrates and defines the flow of data among different units operation: "PUMa, VARe, and USeR interface Diagram" 100. First a server 135 called "PUMa" Provides, Updates, Maintains and services the software system; second another server 150 called "VARe" Validates the data entry, Approves the transaction, and Releases the goods; and third a client 180 called "USeR" Utilizes the software, Sends and Receives data information. The arrows 190 depict the direction of the data flow between interfaced units. The flow of data in diagram 100 between VARe 150 and the USeR 180 is both ways "bidirectional"; the USeR 180 transmits data information to VARe 150 to be processed for validation and VARe 150 transmits back the processed data for approval and release of goods or for disapproval and rejection. The flow of data in diagram 100 between PUMa 135 and VARe 150 is one way "unidirectional"; PUMa 135 checks VARe 150 periodically for update and downloads the necessary data. The flow of data in diagram 100 between PUMa 135 and USeR 180 is also one way "unidirectional"; PUMa 135 installs the software system into USeR 180 client and updates the USeR 180 with new data code parameters downloaded from VARe 150.

Figure 1C:
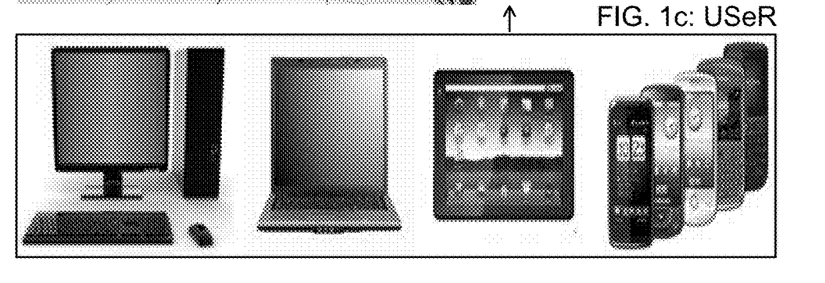
FIG. 1c: Illustrates the USeR Unit.

Drawing sheet number 1/9, FIG. 1a displays a typical PUMa unit 135 constituting of various units capable of downloading data information from VARe unit 150, writing software codes, and uploading data code into USeR unit 180 for proper and legal transaction. FIG. 1b shows a symbolic VARe unit 150 composed of various data code to validate transaction data information for approval and release of goods or for disapproval and rejection. FIG. 1c represents an ordinary USeR unit 180 comprised of a personal computer (PC) or a laptop and or just any electronic devices having the same capabilities as a PC or laptop to perform a typical transaction: Transmit and receive data information.

Figure 2:
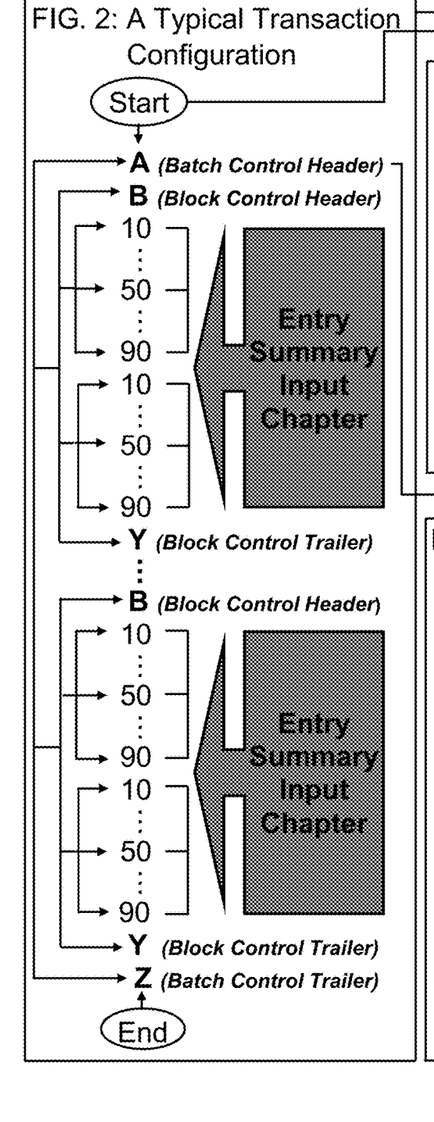
FIG. 2: Illustrates a Typical Transaction Configuration.
Figure 2A:
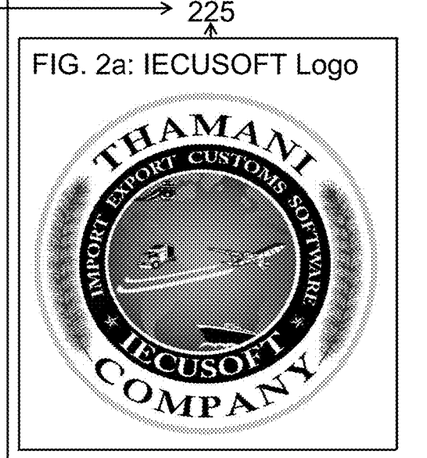
FIG. 2a: Illustrates the Software Logo Start-Up Icon.
Figure 2B:
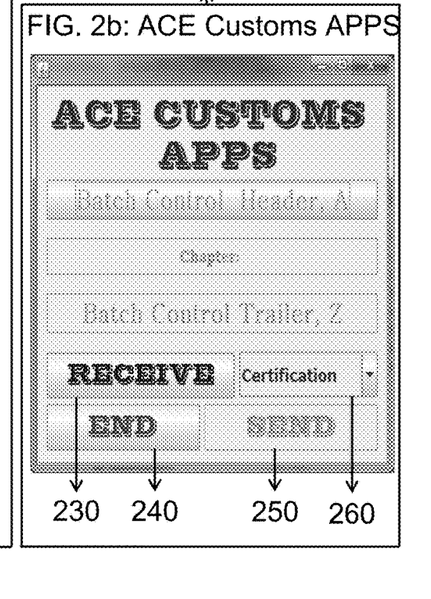
FIG. 2b: Illustrates the ACE Customs APPS Detail.

Drawing sheet number 2/9: FIG. 2: "A Typical Transaction Configuration" 200 displays the software application transaction process and demonstrates a typical Entry Summary Chapter transmission configuration. To launch the software applications simply click or double click on IECU-SOFT Icon 225 acronym for Import/Export CUstoms SOFTware, pronounced 'iqsoft'. FIG. 2a: "IECUSOFT Logo" gives the user access to the main window FIG. 2b: "ACE Customs APPS" 270. Before performing any action the user should first click the RECEIVE button 230 to retrieve any data information that might be in the storage space to clear space for new data information. By clicking the RECEIVE button 230 removes the data information from the storage space and save them on a different location of the user choice upon installation of the software application. The END button 240 closes the software application operation (not VARe server 150 connection) and the SEND button 250 transmits the data information to VARe server 150. The Certification button 260 has two selections: Certification selection signals VARe server 150 to validate the data information for testing purpose only and Production selection signals VARe server 150 to validate the data information for live transaction.

Figure 3:
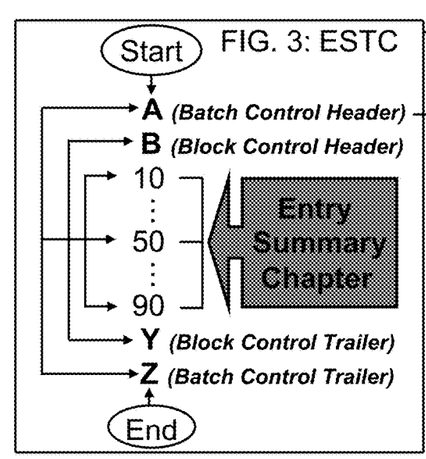
FIG. 3: Illustrates the Entry Summary Transaction Configuration (ESTC)
Figure 3A:
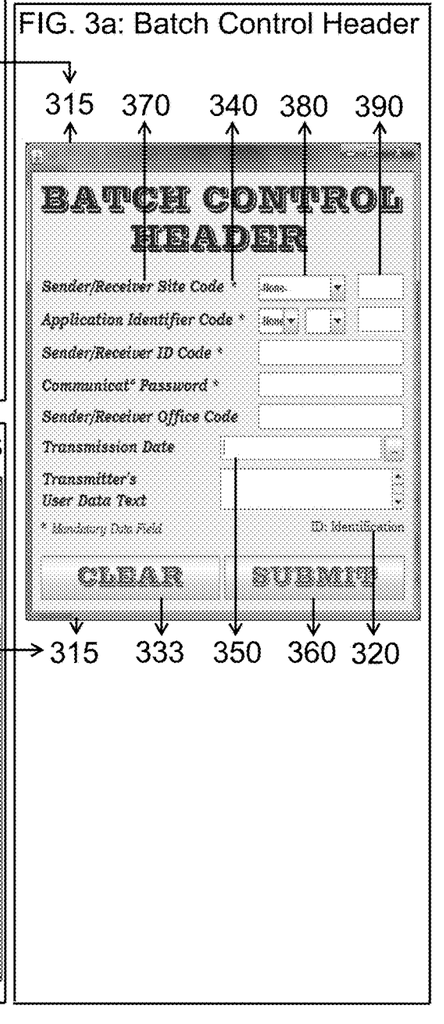
FIG. 3a: Illustrates the Batch Control Identification record.
Figure 3B:
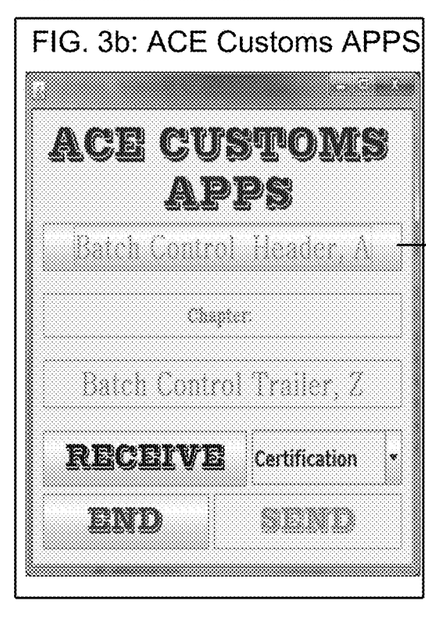
FIG. 3b: Illustrates the ACE Customs APPS.

Drawing sheet number 3/9, FIG. 3: "Entry Summary Transaction Configuration" 300 is a typical transaction process configuration starting first with the user identification header FIG. 3a: "Batch Control Header" 315. FIG. 3b: "ACE Customs APPS" displays the active and or enable button "Batch Control Header" 315 that signals the beginning of the transaction file; and it is used to identify the user and the sender/receiver of the data. Batch Control Header" 315 allows the user to select a chapter to file and only one type of application data can be processed within a typical batch control. The CLEAR button 333 deletes the entire data entry in a record rather than individual field data deletion and the SUBMIT button 360 transmits the entire data entry record to the USeR client before transmitting to VARe server for validation and approval. The date data field 350 is a date picker field feature that formats the date according to CBP format. The data element 370 is the name of the data field element and the red asterisk "*" symbol 340 after the data element symbolizes the data field element is mandatory. The data selection name 380 is the data selection item and places the selected data content in the data field 390. Some data fields 390 are editable and enable; some are not according to the nature of the data required. The data selection name 380 can be a combination of one, two, or three data selection name boxes; and while the software application is in running and or executable mode the data selection name 380 widens itself to fit the selection item content. Also by resting the cursor on a selected data name a definition of the name will appear. To make data element 370, data selection name 380, and data field 390 appropriately viewable in the layout window 315, abbreviations and acronyms 320 have been used to describe the data element name and to optimize the space suitably to fit data element 370, data selection name 380, data field 390, CLEAR & SUBMIT buttons inside the display window.

Figures 4, 4A, 4B:
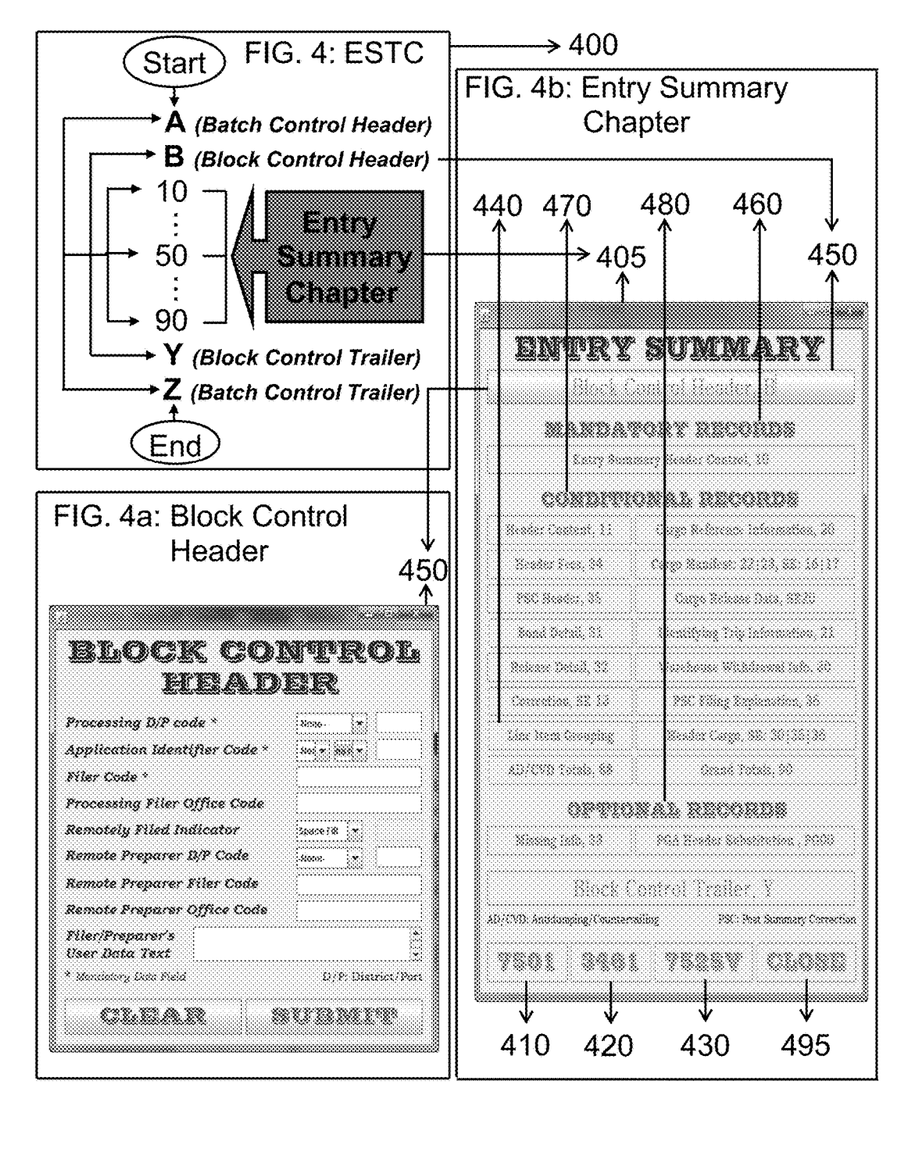
FIG. 4: Illustrates an Entry Summary Transaction Configuration (ESTC)
FIG. 4a: Illustrates the Block Control Identification record.
FIG. 4b: Illustrates the Entry Summary Chapter input records

Drawing sheet number 4/9, FIG. 4: "Entry Summary Transaction Configuration" 400 is a typical import transaction records configuration followed secondly by a detail data identification header FIG. 4a: "Block Control Header" 450. "Block Control Header" 450 is used to identify the detail data to follow and also allows separating data into groups by location; once again only one type of application data is allowed to be processed within a typical block control. FIG. 4b: "Entry Summary Chapter" 405 provides record formats and specifies the unique identity of transaction information regarding item(s) being transacted. "Mandatory Records" 460 must be filed, "Conditional Records" 470 are required records only and only if the data entered in the mandatory record requires any or all conditional records to be filed, and "Optional Records" 480 are not conditioned by any means and it can be filled out by the user preference if it is needed for the transaction in process. Line Item 440 contains information regarding a single article or a component of an article. The software application writes and saves the data entered to the appropriate CBP Forms for later usage using the executable buttons: "Entry Summary Form 7501" 410 for import purposes, "Entry/Immediate Delivery Form 3461" 420 for both import/export purposes, and "Shipper's Export Declaration Form 7525V" 430 for export purposes. The CLOSE button 495 disposes the displayed window.

Figure 5:
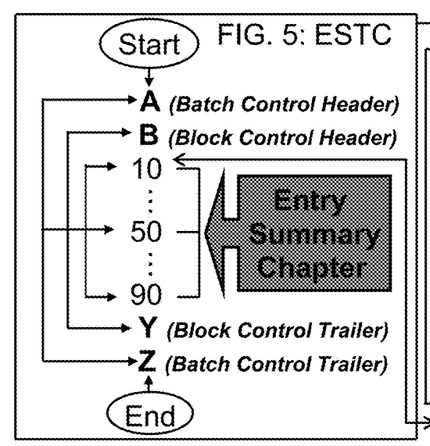
FIG. 5: Illustrates the Entry Summary Transaction Configuration (ESTC)
Figure 5A:
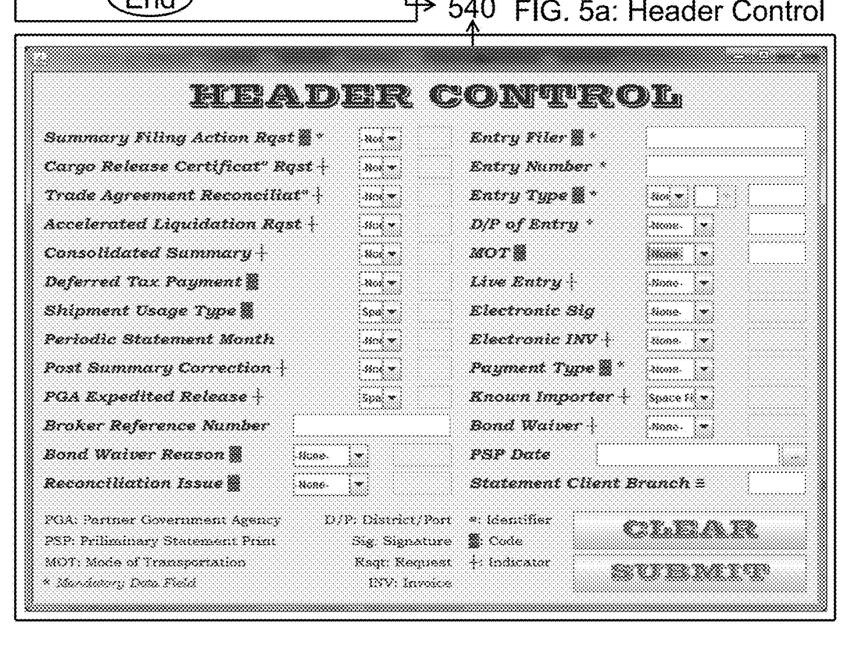
FIG. 5a: Illustrates the Entry Summary Header Control input record.
Figure 5B:
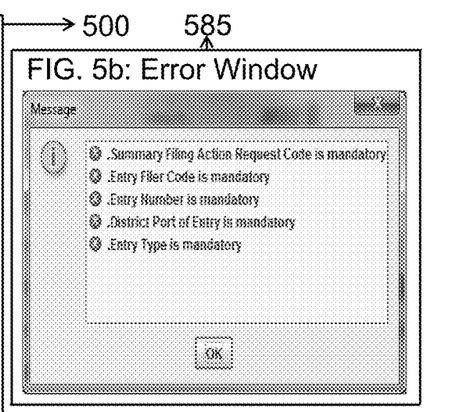
FIG. 5b: Illustrates the generated Window Errors.
Figure 6:
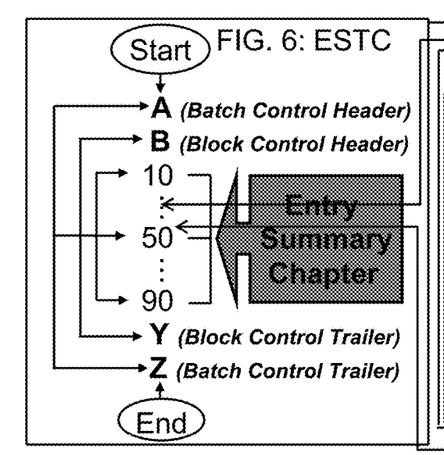
FIG. 6: Illustrates the Entry Summary Transaction Configuration (ESTC)
Figure 6A:
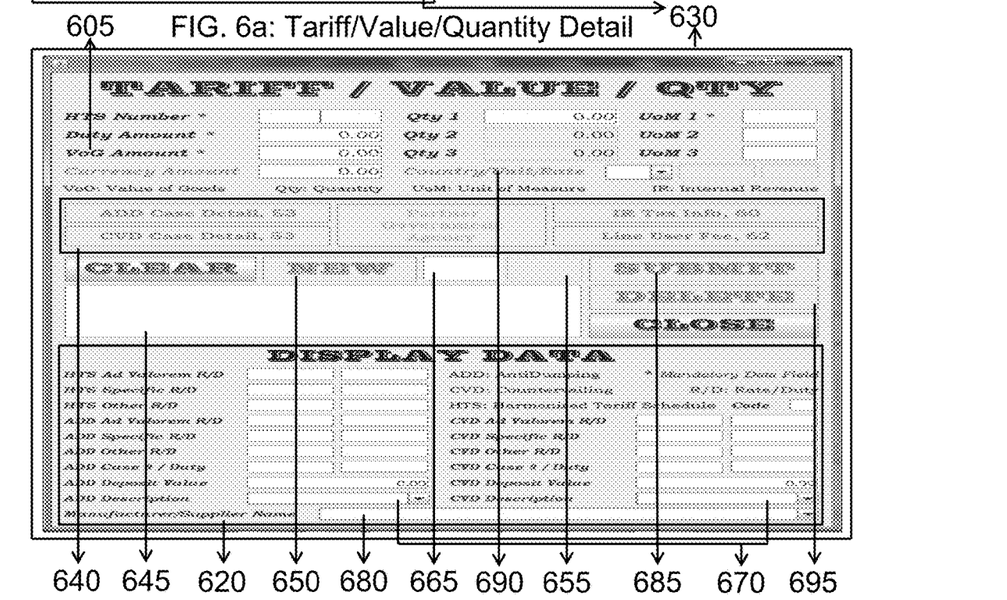
FIG. 6a: Illustrates the Line Item Tariff/Value/Quantity Details input record.
Figure 6B:
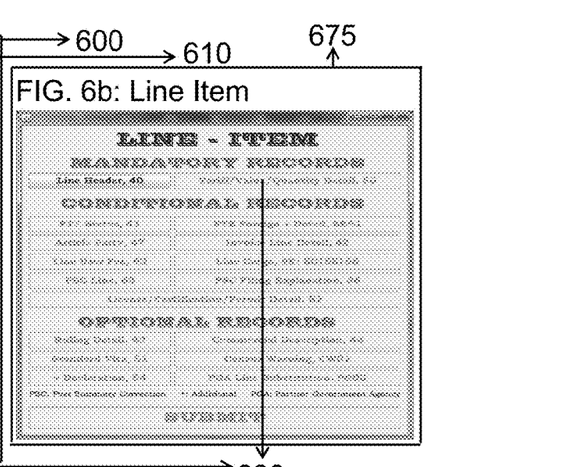
FIG. 6b: Illustrates the Line Item Input records.

Drawing sheet number 5/9, FIG. 5: "Entry Summary Transaction Configuration" 500 is a typical transaction configuration that begins with an entry summary header control record FIG. 5a "Header Control" 540, a mandatory record consisting of information that applies to all items reported for the trade. The "Header Control" 540 is the most essential record of the Entry Summary Transaction Configuration Chapter 500; it carries out various operations that free the user from complex computations. The most important computations performed for the user is the check digit computation; the harmonized tariff schedule duty, fee, and tax calculations; and antidumping and countervailing duty. FIG. 6b "Error Window" 585 is a generated window launched as pop-up window to warn the user that the data entered is (are) invalid. It prompted the user to correct the information entered by providing the user with a hint such as data element is mandatory, data element must be numeric, data element length must be 3 or length must be no more than 9 and so on. The data information won't be submitted until the fields with the errors are corrected.

Drawing sheet number 6/9, the ellipsis symbol ". . ." 610 depicts that there are other required records but the description of this specification is intended to describe the essential records. FIG. 6: "Entry Summary Transaction Configuration" 600 is a typical transaction configuration that includes line item grouping FIG. 6b: "Line Item" 675, containing records needed to file data information about an article or a component of an article. FIG. 6a: "Tariff/Value/Quantity (TVQ) Detail" 630 is a mandatory line item record containing classification information of an article that reports a single tariff classification information at one time; it can be repeated for additional tariff classification information by clicking the SUBMIT button 685 after filling out all the necessary mandatory data fields in FIG. 6a: "Tariff/Value/Quantity (TVQ) Detail" 630 and its associated records 640 if required. The associated records 640 are defined to be the fee, tax, antidumping duty, countervailing duty, and Partner Government Agency. The associated records 640 are grayed out meaning deactivated; they are activated depending on the tariff classification associated to either one of the records. The tariff/value/quantity detail 630 is the most essential record of the tariff grouping; it performs the complex computation formula for tax, fee, and duty for the user, reducing the time consuming, and eliminating the hassle and the confusion of computing these data information. The data computed (fee, tax, duty and rates) are populating on the "Display Data" 620 fields from the USeR client. The "Display Data" 620 are more specific to any article or component description "ADD and CVD Description" 670 and any company in any country "Manufacturer/Supplier Name" 680 for concise and accurate computation. Each individual fees, taxes, and duties for all additional tariff classification information are added up automatically to the grand totals fee, tax, and Duty. The "Currency/Unit/Rate" 690 performs any currency conversion to US dollar currency and places the converted currency result in the Value of Goods Amount field data 605.

Any repeated record similar to FIG. 6a: "Tariff/Value/Quantity (TVQ) Detail" 630 will have the same similar executable buttons: CLEAR, NEW, SUBMIT, DELETE, and CLEAR, including Total Records Submitted display, Record Number display and List Control display. The display "Total Records Submitted" 655 keeps count of the total records submitted for each individual tariff number; the "Record Number" 665 displays the selected record number and populates the data information entered in the "List Control Display" 645. To modify the data information entered or to insert new data information to the selected data information click the NEW button 650; and to delete the selected record click the DELETE button 695.

Figures 7, 7A, 7B:
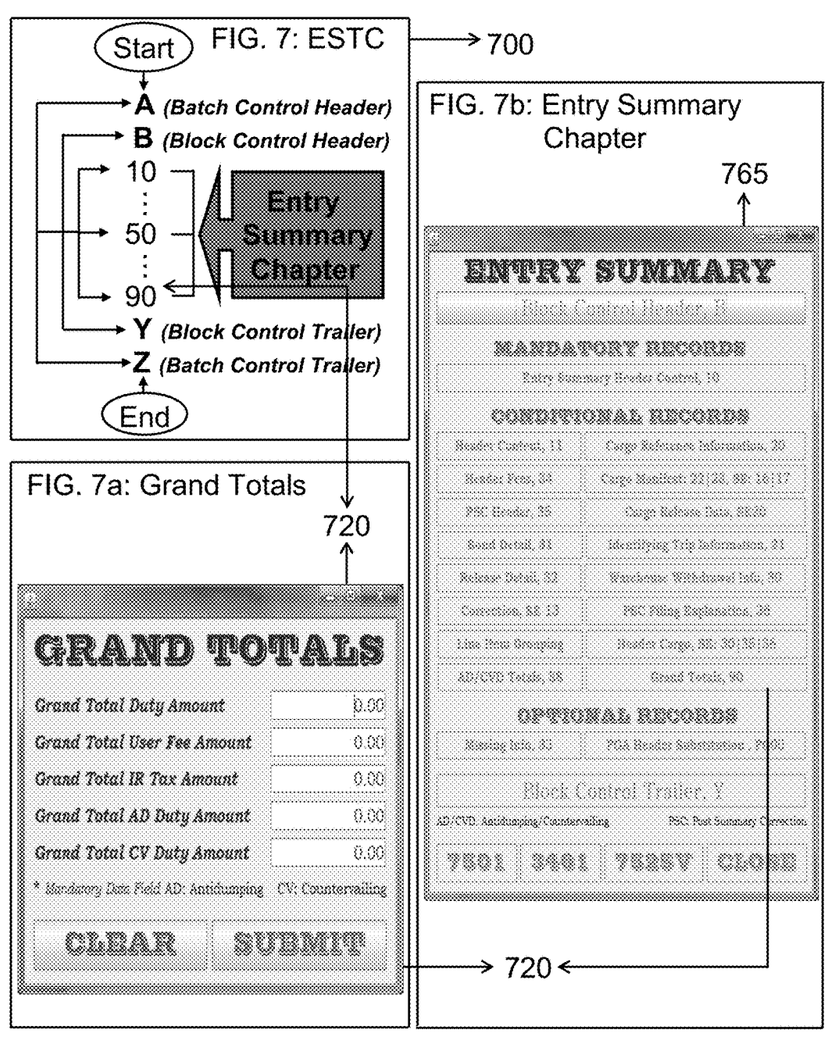
FIG. 7: Illustrates the Entry Summary Transaction Configuration (ESTC)
FIG. 7a: Illustrates the Entry Summary Grand Totals input record.
FIG. 7b: Illustrates the Entry Summary Chapter input records

Drawing sheet number 7/9, FIG. 7: "Entry Summary Transaction Configuration" 700 is a typical transaction configuration that contains the total amount record for any particular transaction. FIG. 7b: "Entry Summary Chapter" 765 provides a total amount record so that individual fees, taxes, and duties for all tariff classification information are added up automatically, generated and populated with the total fee, tax, and duty values on the appropriate data field with the correct format in FIG. 7a: "Grand Totals" 720.

Figures 8, 8A, 8B:
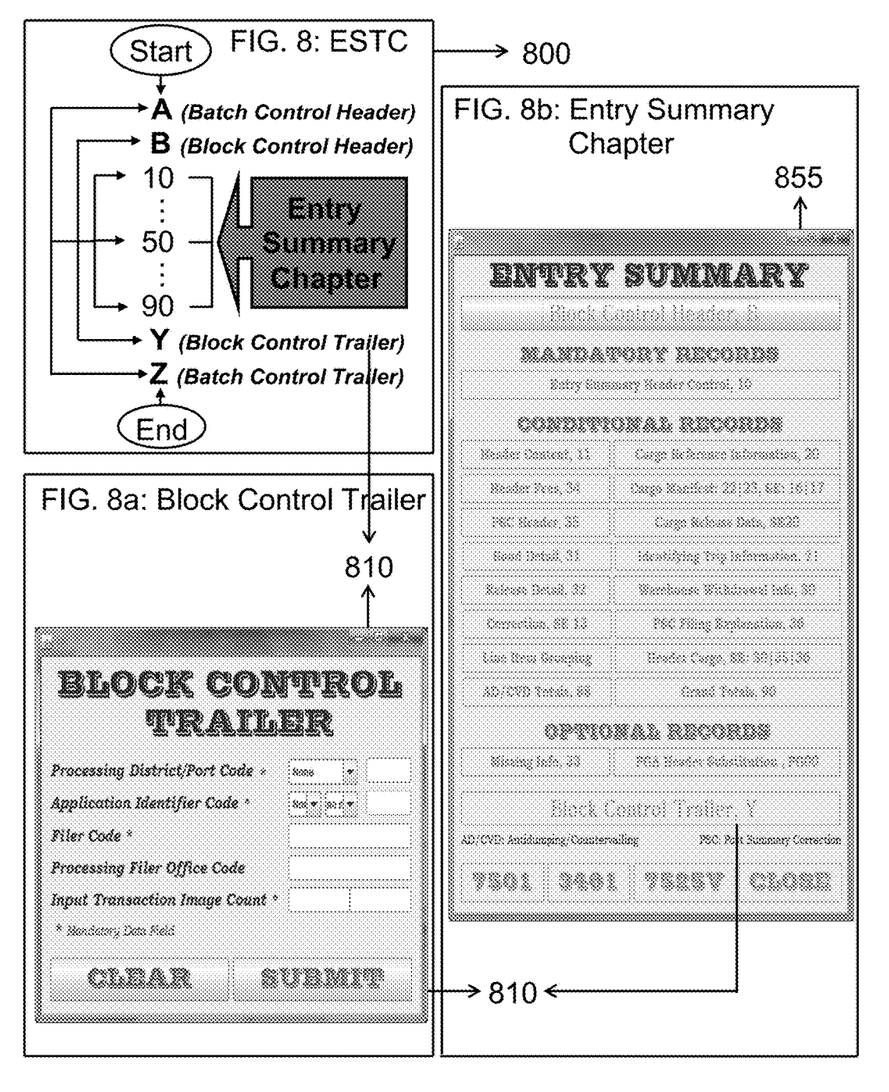
FIG. 8: Illustrates the Entry Summary Transaction Configuration (ESTC)
FIG. 8a: Illustrates the Block Control Closing record.
FIG. 8b: Illustrates the Entry Summary Chapter input records

Drawing sheet number 8/9, FIG. 8: "Entry Summary Transaction Configuration" 800 is a typical transaction configuration that includes a block control trailer to signify the end of the data information. FIG. 8b: "Entry Summary Chapter" 855 provides a block control trailer record FIG. 8a: "Block Control Trailer" 810 to close the detail data information.

Figure 9:
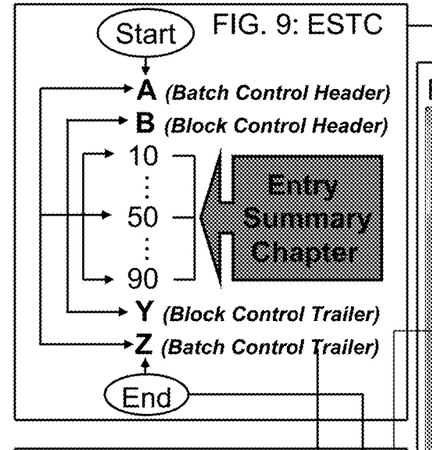
FIG. 9: Illustrates the Entry Summary Transaction Configuration (ESTC)
Figure 9A:
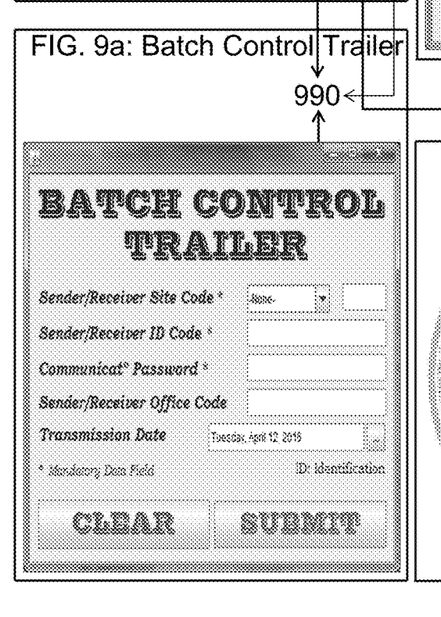
FIG. 9a: Illustrates the Batch Control Closing record.
Figure 9B:
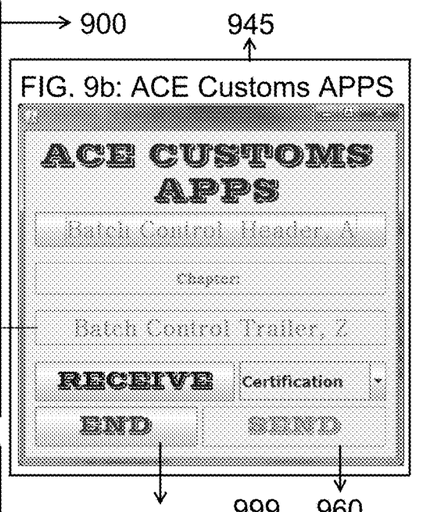
FIG. 9b: Illustrates the ACE Customs APPS.
Figure 9C:
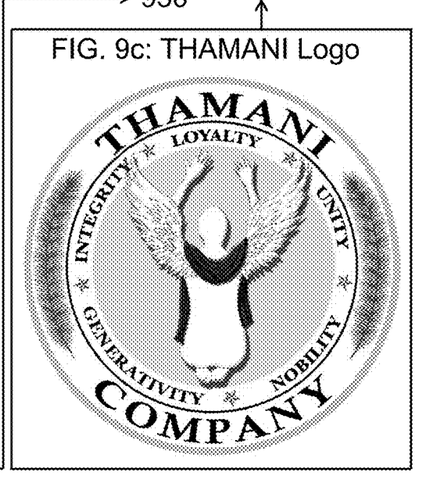
FIG. 9c: Illustrates the Company Logo Software Closing Icon.

Drawing sheet number 9/9, FIG. 9: "Entry Summary Transaction Configuration" 900 is a typical transaction configuration that includes a batch control trailer to signify the end of the transaction file. FIG. 9b: "ACE Customs APPS" 945 provides a batch control trailer record FIG. 9a: "Batch Control Trailer" 990 to close the transaction data file and to submit the filed data to a local USeR client; this operation will activate the SEND button 960. Open the VPN (Virtual Private Network) and click on the SEND button 960 to transmit data information to VARe server 150; then click on the END button 930 to end the software application (IECUSOFT); the company logo FIG. 9c: "THAMANI Logo" 999 will appear for a few seconds to acknowledge that the trade has been completed.

While the software, system and method have been considered to be the most practical and effective embodiments, it is to be understood that the disclosure need not to be limited to the disclosed embodiments. It is intended to be included within the scope of the present invention to encompasses all such permutations, enhancements, modifications, equivalents, combinations, and improvements that fall within the true scope of the present invention defined in the description, drawings, figures, and claims. Although specific terms are employed, they are used in a generic and descriptive sense only and not for purposes of limitation. Therefore, any person of ordinary skill in the pertinent art or science will recognize these traits or features without departing from the scope of the present invention.

The invention claimed is:

1. Import/Export Customs Software (IECUSOFT) application system is designed and developed as an Operational Database Application Server (PUMa), comprising:
   a memory for storing the IECUSOFT application;
   one or more processors configured to execute the IECUSOFT application instructions to:
   accurately monitor customs entry summary information by indicating the beginning and ending position of data interchanging between a Client (USeR) and a Database Server (VARe) within a specific determined character record in a queue, wherein monitoring customs entry summary information keeps transmission of data information consistent, emplaces and modifies the IECUSOFT application settings, and authorizes and declares goods;
   correctly control customs entry summary information by indicating a maximum data entry length allowed and by defining a class or a domain of values accepted interchanging between the Client (USeR) and the Database Server (VARe) within the specific determined character record in the queue, wherein the controlling customs entry summary information keeps the transmission of the data information conform to the maximum data entry length allowed; and specifically regulate customs entry summary information by indicating reporting requirement designation interchanging between the Client (USeR) and the Database Server (VARe) within the specific determined character record in the queue, wherein regulating customs entry summary information verifies legitimacy of requested data using arithmetic computation.

2. The system of claim 1, wherein said indicating the beginning and ending position further include a data processing capability to access, emplace, and modify data information accurately in logical order in their respective position in the queue.

3. The system of claim 1, wherein said indicating the beginning and ending position further include a recovery capability to retrieve information accurately beforehand in sequential steps and places the information in their respective location in the queue before transmitting either for certification and or production.

4. The system of claim 1, wherein said indicating the beginning and ending position further include an analysis capability to accurately process, legalize, and accept data information.

5. The system of claim 1, wherein said indicating the beginning and ending position further include an inspection capability to accurately inspect, modify, and process data information for the USeR.

6. The system of claim 1, wherein said indicating the beginning and ending position further include a three way communication capability to accurately manage the flow of data among PUMa, VARe, and USeR for certification and acceptance of the data information.

7. The system of claim 1, wherein said indicating the maximum data length further include a system intervention ability to correctly overwrite data information within the required limits in their respective position in the queue.

8. The system of claim 1, wherein said indicating the maximum data length further include a detection ability to correctly restraint unwanted records and allow wanted records to be submitted within the required limits in their respective location in the queue.

9. The system of claim 1, wherein said defining the class or the domain of value(s) accepted further includes a unique algorithm ability to correctly generate records within the required limits in their respective position in the queue.

10. The system of claim 1, wherein said defining the class or the domain of value(s) accepted further includes a framework ability to correctly classify records within the required limits in their respective location in the queue.

11. The system of claim 1, wherein said defining the class or the domain of value(s) accepted further includes an identification ability to correctly identify and perform ambiguous data entry read/write within the required limits in their respective location in the queue, then display on CBP form.

12. The system of claim 1, wherein said indicating the reporting requirement designation further includes an arithmetic capability to specifically identify formula(s) needed to compute various requested data information within the required limits in their respective location in the queue.

13. The system of claim 1, wherein said indicating the reporting requirement designation further includes a look up data capability to specifically retrieve requested generated data information to enclose in the data transmission within the required limits in their respective location in the queue.

14. The system of claim 1, wherein said indicating the reporting requirement designation further includes a sorting data capability to specifically display the selected required data information for computation to enclose in the data transmission within the required limits in their respective location in the queue.

15. The system of claim 1, wherein said indicating the reporting requirement designation further includes a front and back end correction data capability to specifically point out then remove data information erred within the required limits in their respective location in the queue.

16. The system of claim 1, wherein said indicating reporting requirement designation further includes a repository data capability to specifically retrieve data information to use in the current transaction within the required limits in their respective location in the queue.

* * * * *